Patented May 17, 1949

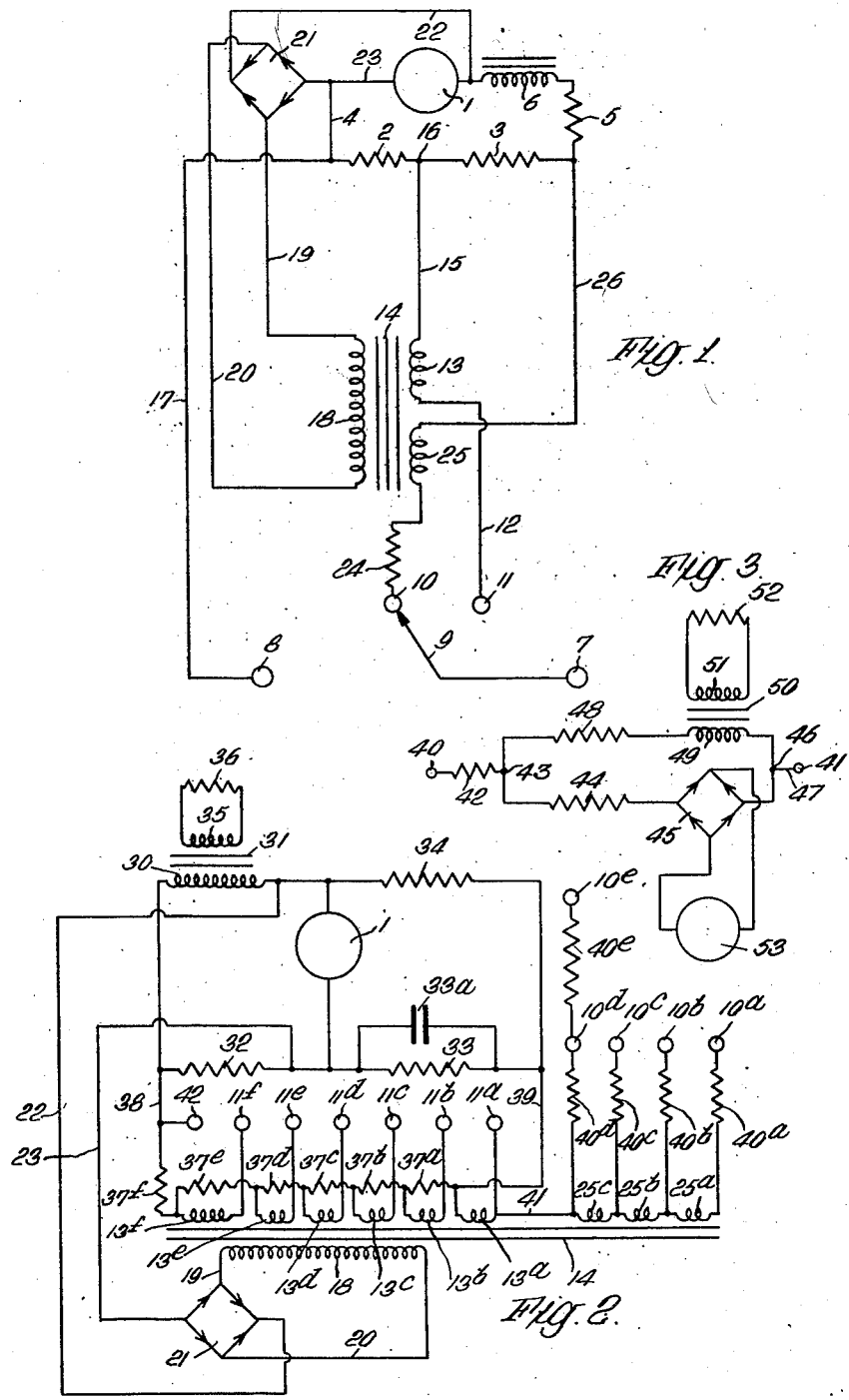

2,470,644

UNITED STATES PATENT OFFICE 2,470,644

ELECTRICAL MEASURING INSTRUMENT

John Cecil Redman, Harrow Weald, England

Application November 19, 1946, Serial No. 710,782
In Great Britain November 19, 1945

7 Claims. (Cl. 171—95)

This invention relates to rectifier fed, permanent magnet, moving coil electrical measuring instruments, and has for its object to provide a measuring instrument of this kind which can be used both on alternating and direct current circuits.

It is usual in cases where such instruments are required for use alternatively on alternating and direct current circuits to provide two entirely separate internal circuit systems, the instrument being made suitable for the appropriate supply by means of a hand operated selector switch.

The object of the invention is to provide a construction of electrical measuring instrument which can be used on alternating current or direct current circuits without the necessity for making a circuit selection.

To this end, according to the present invention, the instrument is provided with a circuit common to both alternating current and direct current for connection to the supply to be tested, the said common circuit including one or more elements possessing induction whereby when the instrument is connected to a direct current supply the said elements act as a current path having negligible resistance; whereas when the instrument is connected to alternating current supply the said elements increase the total circuit resistance.

In order that the invention may be more completely understood two embodiments thereof will now be described by way of example with reference to the accompanying diagrammatic drawings in which Figure 1 shows diagrammatically one arrangement of an instrument according to the invention for measuring either alternating current or direct current, or alternating current or direct current voltage over a single range, Figure 2 shows diagrammatically a modified form of instrument for use over a number of different ranges and wherein the instrument movement is relatively highly sensitive, and Figure 3 shows a voltmeter.

In the construction illustrated in Figure 1 the meter movement 1 is provided with a universal shunt formed by resistances 2 and 3, one end of the said shunt being connected to the movement 1 through lead 4, while the other end thereof is connected to the movement through a swamp resistance 5 and inductance 6.

The instrument is provided with input terminals 7 and 8 to which the circuit in respect of which the measurement is to be made is connected whether it is the current in or the voltage across said circuit which is to be measured.

The input terminal 7 may be connected through a two-position switch, indicated diagrammatically at 9, either to a contact 10, for voltage measurements, or to a contact 11 for current measurements.

The current contact 11 is connected through lead 12 to one end of the primary winding 13 of a transformer 14, the other end of the primary winding being connected through lead 15 to the junction 16 between resistances 2 and 3.

One end of the universal shunt formed by resistances 2 and 3 is connected through lead 17 to the input terminal 8. The secondary winding 18 of transformer 14 is connected by leads 19 and 20 to the A. C. terminals of a bridge rectifier 21 of which the D. C. terminals are directly connected through leads 22 and 23 to the meter movement 1.

The voltage contact 10 is connected through a series resistance 24 to a second primary winding 25 of transformer 14 and thence through lead 26 to the junction of resistances 3 and 5.

In order to measure direct current, the switch 9 is positioned to engage the current contact 11, the current is fed in at input terminal 7 and passes through switch 9, contact 11, lead 12, transformer primary 13 and lead 15 to the junction 16 where it divides, part transversing the resistance 2, and part passing through resistances 3 and 5 and inductance 6, meter movement 1 and lead 4, the current leaving through lead 17 and terminal 8.

In this case the transformer primary 13 and the inductance 6 play no part in the steady distribution of current but serve only as connecting leads.

In order to measure an alternating current the switch 9 is maintained in contact with the contact 11 and, in this case, the current passes from input terminal 7 through switch 9, transformer primary 13, and lead 15 as before, to the junction 16. In this case the load formed by the rectifier 21 and the meter movement 1 shunted by resistances 2, 3 and 5 and inductance 6 all in series appears reflected into transformer primary 13 and the indicating element of the meter is deflected owing to the secondary current.

The primary current passes to the junction 16 through lead 15.

The impedance of the inductance 6 is so selected that the alternating current passing through resistance 5, inductance 6 meter movement 1 and lead 4 is reduced to negligible proportions so that the current flows through resistance 2 and lead 17 to the terminal 8.

In order to measure a D. C. potential difference the switch 9 is moved into its other position to engage contact 10. In this case the current flows from terminal 7 through switch 9, contact 10, resistance 24, transformer primary 25 and lead 26 to the junction between resistances 3 and 5 where it divides, part passing through resistances 3, 2, to lead 17 and terminal 8, while the other part passes through resistance 5, inductance 6, and the meter movement 1 to lead 17. The primary 25 and inductance 6 serve only as connecting leads.

In order to measure an A. C. potential difference the switch 9 is left in engagement with contact 10, and in this case the current flows as described above from terminal 7 through resistance 24 and primary winding 25 to the junction between resistances 3 and 5.

The load formed by the rectifier 21 and the meter movement 1, shunted by resistances 2, 3 and 5, and inductance 6 appears in reflected form in the primary winding 25 of transformer 14 whereby current is caused to flow in the secondary circuit 18, 19, 20 and 21, and after rectification passes to the meter movement 1 through lead 23.

As before the impedance of inductance 6 blocks the current from primary winding 25 which passes through resistances 3 and 2 to lead 17.

The arrangement shown in Figure 2 provides for a number of current or voltage ranges and is also particularly suitable for use with a meter movement of the highest sensitivity.

In this arrangement the meter movement 1 is shunted through the primary winding 30 of a transformer 31 by a resistance 32 and also by a universal shunt formed by resistances 33 and 34 of which the resistance 33 is shunted by a condenser 33a. The secondary winding 35 of transformer 31 is closed by a resistance 36.

As in the Figure 1 construction the transformer 14 has its secondary winding 18 connected through leads 19 and 20 to the alternating current terminals of a rectifier 21 of which the direct current terminals are connected to the meter movement through leads 22 and 23.

For each current range there is provided a separate primary winding 13a, 13b, 13c, 13d, 13e, and 13f of which one end is connected to a corresponding current input terminal 11a, 11b, 11c, 11d, 11e, 11f, while the other end is connected through one or more of the resistances 37a—37f depending upon the range to which the particular winding pertains.

The resistances 37a—37f form a universal shunt connected across the resistances 32 and 33 through leads 38 and 39.

Five voltage ranges are provided, the corresponding in-put terminals being shown at 10a to 10e.

For each of the three lowest ranges each of the terminals 10a, 10b, 10c is connected through its associated resistances 40a, 40b, 40c, to one end of associated primary winding 25a, 25b, 25c of the transformer 14, these three windings being connected in series and through lead 41 to the winding 13a.

The resistances 40d, and 40e for the highest voltage ranges are connected to the winding 13a for the lowest current range through lead 41.

The other input terminal 42 which is common to all renewals is connected to lead 38.

With this arrangement when using the device on a D. C. circuit the transformers 14 and 31 take no part in the current distribution when the steady state is reached but on A. C. circuits the steady distribution of current in the instrument circuit is determined both by the resistances 32, 33, 34 and by the two transformers 14 and 31.

The transformer 31 balances the bridge net formed by resistance 36 reflected and resistances 32, 33 and 34 so that there is no alternating potential difference across the meter movement 1.

The voltmeter illustrated in Figure 3 is provided with input terminals 40 and 41 of which the terminal 40 is connected through dropping resistance 42 to point 43 and thence through resistance 44 and rectifier 45 to point 46 to which the terminal 41 is connected through lead 47.

Connected across the points 43 and 46 is a shunt circuit including resistance 48 in series with the primary winding 49 of a transformer 50 of which the secondary winding 51 is closed by a resistance 52.

The instrument movement 53 is connected across the direct circuit terminals of the rectifier 45.

When used to test a direct current circuit the shunt circuit across the branch containing the rectifier 45 consists of the resistance 48 and the primary winding 49 of transformer 50.

When used to test an alternating current circuit the resistance of said shunt circuit is increased by the load resistance 52 appearing in the primary winding 49 of the transformer, whereby by selecting the magnitude of resistance 52 so as to multiply the current flowing through 44, 45 by the form factor of the supply, a true reading is obtained from the meter when used on A. C. as well as when used on D. C.

I claim:

1. A permanent magnet, moving coil, electrical measuring instrument including in combination a rectifier having alternating current terminals, electrical connections connecting the direct current terminals of said rectifier to the instrument movement, an instrument movement circuit including a resistance shunt, an inductance in series with said shunt, a transformer having its secondary winding connected across the alternating current terminals of the rectifier, and an input lead connected to the resistance shunt through a primary winding of the transformer.

2. A permanent magnet, moving coil, electrical measuring instrument including in combination a rectifier having alternating current terminals, electrical connections connecting the direct current terminals of said rectifier to the instrument movement, an instrument movement circuit including a resistance shunt, a transformer having its secondary winding connected across the alternating current terminals of the rectifier, an input lead connected to the resistance shunt through a primary winding of the transformer, and a choke in series with said resistance shunt.

3. A permanent magnet, moving coil, electrical measuring instrument including in combination a rectifier for feeding the instrument movement said rectifier having alternating current terminals, a bridge circuit into which the instrument movement is connected, said bridge circuit comprising a first resistance arm, a second resistance arm, a third resistance arm and a fourth arm containing the primary winding of a transformer, a resistance closing the secondary winding of said transformer, a further transformer having its secondary winding connected across the alternating current terminals of the rectifier, and a current input lead connected to the bridge circuit through a primary winding of said further transformer.

4. A permanent magnet, moving coil, electrical measuring instrument including in combination a rectifier for feeding the instrument movement said rectifier having alternating current terminals, an instrument movement circuit including a resistance shunt, an inductance in series with said resistance shunt, a transformer having its secondary winding connected across the alternating current terminals of the rectifier, a current input lead connected to the resistance shunt circuit through one primary winding of the transformer and a voltage input lead connected to the resistance shunt circuit through another primary winding of said transformer.

5. A permanent magnet, moving coil, electrical measuring instrument including in combination a rectifier for feeding the instrument movement said rectifier having alternating current terminals, a bridge circuit into which the instrument movement is connected, said bridge circuit comprising a first resistance arm, a second resistance arm, a third resistance arm, and a fourth arm containing the primary winding of a transformer, a resistance closing the secondary winding of said transformer, a further transformer having its secondary winding connected across the alternating current terminals of the rectifier, a current input lead connected to the bridge circuit through one primary winding of said further transformer, and a voltage input lead connected to the bridge circuit through another primary winding of said further transformer.

6. In a permanent magnet, moving coil voltmeter, the combination of a rectifier for feeding the instrument movement, a resistance in series with said rectifier, a shunt circuit connected across said resistance and rectifier, a second resistance and the primary winding of a transformer disposed in series with one another in said shunt circuit, a resistance closing the secondary winding of said transformer, and input leads respectively connected to opposite ends of said shunt circuit.

7. A permanent magnet, moving coil electrical measuring instrument including in combination a rectifier for feeding the instrument movement said rectifier having alternating current terminals, a bridge circuit into which the instrument movement is connected, said bridge circuit comprising a first resistance arm, a second resistance arm, a third resistance arm and a fourth arm containing a choke; a condenser in parallel with the one of said resistances which is in the arm of said bridge opposite to the arm containing said choke; a transformer having its secondary winding connected across the alternating current terminals of the rectifier, and an input lead connected to the bridge circuit through a primary winding of said transformer.

JOHN CECIL REDMAN.

REFERENCES CITED

The following references are of record in the file of this patent:

UNITED STATES PATENTS

| Number | Name | Date |
|---|---|---|
| 1,811,319 | Johnson | June 23, 1931 |

FOREIGN PATENTS

| Number | Country | Date |
|---|---|---|
| 579,838 | Germany | June 15, 1933 |
| 366,882 | Italy | Jan. 11, 1939 |